Patented June 20, 1939

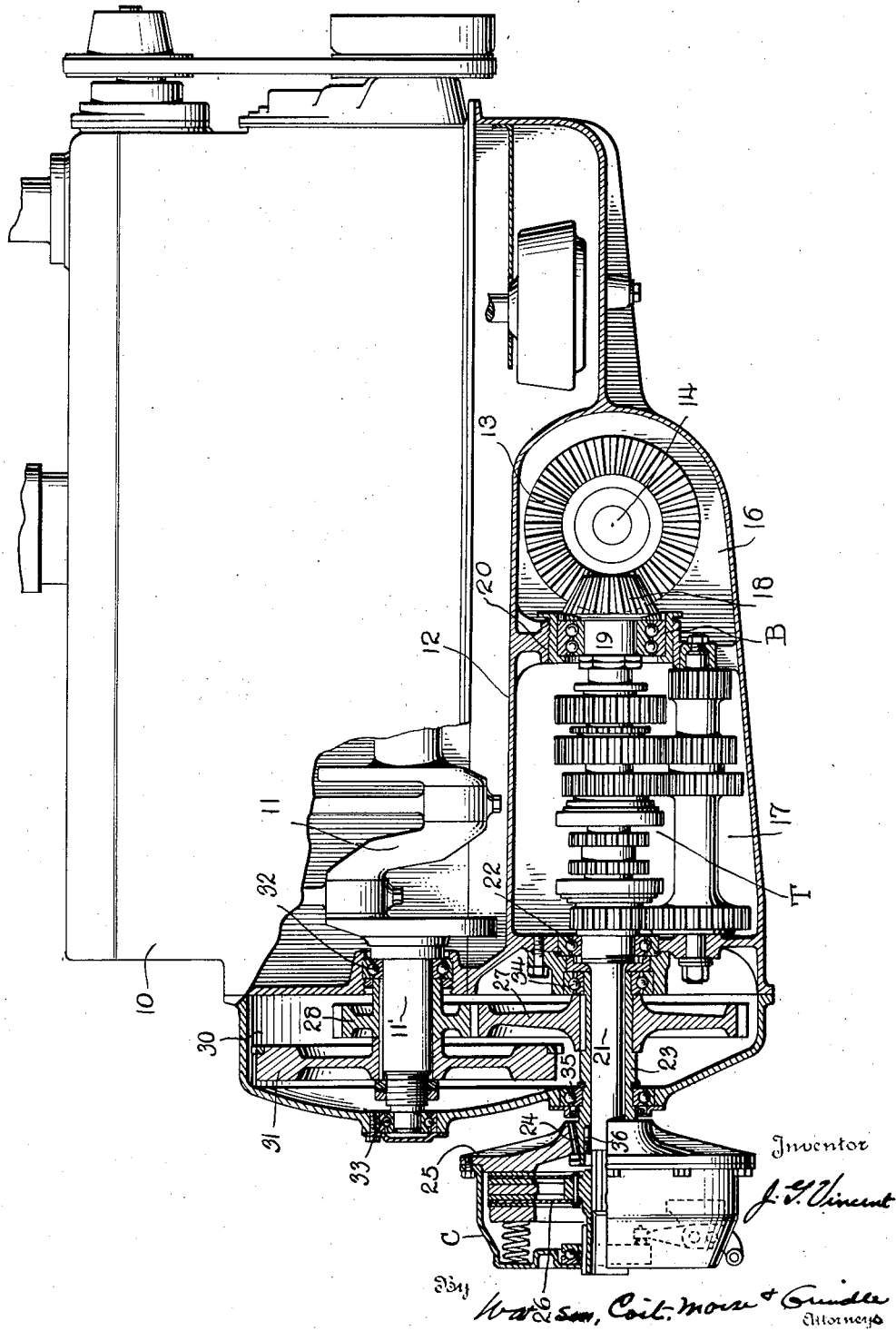

2,163,476

UNITED STATES PATENT OFFICE 2,163,476

POWER PLANT FOR MOTOR VEHICLES

Jesse G. Vincent, Grosse Pointe, Mich., assignor to Packard Motor Car Company, Detroit, Mich., a corporation of Michigan Application November 19, 1936, Serial No. 111,745

4 Claims. (Cl. 74—326)

This invention relates to power plants for motor vehicles.

The motor vehicle power plant has, by a process of evolution, reached such stage of development that it almost invariably includes certain essential elements, such elements being the motor itself, or internal combustion engine, a differential mechanism associated with an axle or axles to be driven, and power transmission means connecting the engine and differential which includes a clutch and change speed gearing, commonly known as the "transmission." Numerous suggestions have been advanced for the improvement of the individual elements which together comprise such a power plant and it has also been proposed that, in adapting the power plant to motor vehicles of various types, the several elements thereof may be positioned in various ways with relation to each other.

The present invention contemplates primarily a novel and advantageous rearrangement of the essential elements of a motor vehicle power plant, the purpose being to provide a power plant of such character that the engine, clutch, and transmission are all positioned in close proximity to the differential and driven axle in order to realize the advantage of compactness without sacrifice of the advantage of utilization of conventional power plant elements of known and tried type. The advantages to be realized from the use of a compact power plant will readily be appreciated, particularly where the power plant is to be positioned intermediate the rear driving wheels of a motor vehicle. A power plant constructed in accordance with the present invention is, however, equally suitable for use in connection with a motor vehicle the front wheels of which are to be driven. In both cases it is highly desirable to have the center of gravity of the power plant as an entirety positioned as low as possible with respect to the driven axle, or axles, in order to promote stability of the vehicle when rounding curves. In accordance with the invention a power plant unit with low center of gravity is provided, and this objective is realized without abandonment of the use of the vertical type of internal combustion engine with cylinders in line, which type of engine has been found to be so efficient in use.

In furtherance of the main objects of the invention various reorganizations or modifications of the several conventional elements of the power plant have been effected, as will hereinafter be made clear, and additional advantageous results obtained. Thus the driving connection between the engine crank shaft and the differential mechanism includes a speed reduction gearing of such character that the transmission gearing main shaft is caused to revolve, when the power plant is in operation, at considerably less speed than the engine crank shaft, for instance at one-half of the speed of the crank shaft. The desired relationship, however, between the angular velocity of the engine crank shaft and the angular velocity of the driven axle or axles is maintained for all speeds of the vehicle, the ring gear of the differential being reduced in diameter an amount sufficient to compensate for the reduction in speed between the engine crank shaft and the transmission gearing main shaft. Reduction in diameter of the ring gear of the differential in turn permits the engine itself to occupy a lower position relatively to the axis of rotation of the ring gear than would otherwise be possible in a power plant in which the engine is positioned above the differential, thus promoting vehicle stability. By reason of these, and other novel features of the improved power plant, longer life of the power plant is insured, the transmission particularly being subjected to less wear due to the slower rotation of its gears, and noiselessness being at the same time promoted. In addition to rearranging and modifying the various operating parts of the power plant, the invention provides a novel and advantageous enveloping casing for the several elements of the power plant.

The invention may be embodied in power plant constructions which vary somewhat in details and arrangement of parts, as will be apparent to one skilled in the art, and in the accompanying drawing is disclosed one form of the invention by way of example. The drawing illustrates, partially in side elevation, and partially in longitudinal vertical section, a power plant of the type contemplated, and which will now be described in detail.

The engine block is indicated at 10 and, inasmuch as the engine details may vary widely without consequence so far as the present invention is concerned, they are not illustrated. It may be said, however, that while the invention is not limited to the use of an engine of the vertical in-line type, it is particularly advantageous where such an engine is employed in the power plant, and the engine shown is of that type. The engine crank shaft is indicated at 11 and the bottom or lower wall of the engine crank case at 12. The driven axle or axles extend transversely to the plane of the engine and the differential is directly below the engine, the ring gear of the differential being indicated at 13 and being supported for revolution about a generally horizontal axis 14 disposed normally to the plane of the engine 10 and preferably close to the midpoint of the engine crank shaft.

The differential mechanism is enclosed within a compartment 16 the walls of which are preferably integral with the engine crank case as shown. A second compartment 17, also rigid with the engine crank case, houses a transmission mechanism generally indicated at T and which will not be described in detail since it may be of any suitable conventional type permitting the desired changes of speed of drive of the ring gear 13. A bevelled pinion 18 within the differential compartment, and the teeth of which mesh with the teeth of ring gear 13, transmits the rotary motion of the shaft 19 of the transmission to the ring gear, shaft 19 passing through an aperture in the partition 20 intermediate the differential and transmission compartments, and being rotatably supported in a bearing B.

The transmission gearing main shaft is indicated at 21 and is seen to project without the transmission compartment 17, the compartment end wall having a suitable cylindrical aperture through which the shaft 21 extends and a bearing 22 rotatably supporting the shaft where it passes through this wall. The cylindrical end extension 11' of crank shaft 11 is seen to project through an aperture formed in an end wall of the crank case and the transmission gearing main shaft just referred to is disposed parallel to and is positioned directly below this projecting end of the engine crank shaft. Mounted for free rotation upon the cylindrical outer surface of the gearing main shaft 21 is a sleeve 23 to the outer end of which is keyed, by key 24, one part 25 of a clutch, generally indicated at C. A cooperating part 26 of the clutch C is fixed upon the outer end of the gearing main shaft 21. The precise details of construction of the clutch may be varied widely. The clutch illustrated is of the friction type and embodies two friction plates, but it will be understood that any other suitable type of clutch having the capacity to operatively connect gearing main shaft 21 to sleeve 23, or permit ready disconnection of these elements, may be employed.

Fixed upon sleeve 23 is a spur gear 27 and fixed upon the projecting end 11' of the crank shaft is a spur gear 28, the teeth of gears 27 and 28 being in constant mesh. The rotary motion of the crank shaft is therefore communicated through gears 28 and 27 to sleeve 23 and, from sleeve 23 to gearing main shaft 21 when the clutch C is engaged. It will be observed that the diameter of gear 27 is approximately twice that of gear 28 so that the speed of rotation of the sleeve 23, and hence of the gearing main shaft 21, will be approximately half the speed of the crank shaft 11. A housing 30 encloses the gearing just described and likewise encloses a flywheel 31 fixed upon the end of the crank shaft 11. Anti-friction bearings are provided wherever necessary to firmly support the various moving parts of the mechanism for free rotation, crank shaft supporting roller bearings being indicated at 32 and 33, sleeve supporting bearings at 34 and 35, and a roller bearing 36 being positioned intermediate the outer end of sleeve 23 and the gearing main shaft 21, to prevent binding of the sleeve and shaft due to the application of the major portion of the weight of the clutch to the end of the sleeve.

In the operation of the power plant the rotary motion of the crank shaft will, as has previously been explained, be transmitted to the gear 28 and thence to the sleeve 23 through gear 27, sleeve 23 operating at considerably reduced angular velocity as compared with that of the crank shaft due to the speed reducing effect of gears 28 and 27. Preferably sleeve 23 will rotate at one-half the speed of the crank shaft. When the interengageable parts of clutch C are in contact, the rotary motion of sleeve 23 is communicated to the gearing main shaft 21 and, after passing through the transmission T, is communicated to the ring gear 13 by means of bevel pinion 18. Ring gear 13 is, as has previously been pointed out, of reduced size, i. e., reduced diameter. By reduced diameter it is meant that this gear has a diameter substantially less than that of one which would normally be used to produce the desired angular velocity of axle rotation for a given engine speed were no reduction gearing interposed between crank shaft and ring gear. Reduction in diameter of the ring gear 13 makes it possible to lower the engine relatively to the axis of rotation of the ring gear, thus lowering the center of gravity of the power plant as a whole. The ring gear illustrated has a diameter most suitable for a construction in which there is substantially a two-to-one reduction in speed of rotation between the crank shaft and a driven shaft such as the gearing main shaft 21. If the speed reduction here were made greater than two-to-one, the diameter of the ring gear could be still further decreased, although there are of course certain practical considerations which tend to prevent reduction of the ring gear in diameter below a certain limit. Where the speed reduction is less than two-to-one the diameter of the ring gear will be increased. Hence it is possible by employing various types of reduction gearing in the driving connection between the crank shaft and the ring gear to modify the diameter of the ring gear, within certain limits, and without at the same time disturbing the desired basic relationship between crank shaft angular velocity and the angular velocity of the driven axle or axles.

Having thus described the invention, what is claimed as new and desired to be secured by Letters Patent is:

1. A power plant for motor vehicles comprising in combination, an engine having a generally horizontal crank shaft, a differential mechanism having a ring gear mounted for rotation approximately in the vertical plane of the crank shaft, said ring gear being below the crank shaft and intermediate the ends thereof, and means operatively connecting the differential mechanism and the engine crank shaft, said means including a transmission also located below the engine crank shaft, a clutch one element of which is connected to said transmission, and meshed gearing connecting the other element of the clutch to the engine crank shaft, whereby a compact power plant is provided.

2. A power plant for motor vehicles comprising in combination, an engine having a generally horizontal crank shaft, a differential mechanism having a ring gear mounted for rotation approximately in the vertical plane of the crank shaft, said ring gear being below the crank shaft and intermediate the ends thereof, and means operatively connecting the differential mechanism and the engine crank shaft, said means including a transmission also below the engine crank shaft, a clutch having one element connected to the transmission, and meshed speed reduction gearing connecting the other clutch element to the engine crank shaft, whereby a relatively small ring gear may be used and a compact power plant provided.

3. A power plant for motor vehicles comprising in combination, an engine having a generally horizontal crank shaft, a differential mechanism having a ring gear mounted for rotation approximately in the vertical plane of the crank shaft, said ring gear being below the crank shaft and intermediate the ends thereof, and means operatively connecting the differential mechanism and the engne crank shaft, said means including a transmission also located below the engine crank shaft and having a transmission main shaft parallel to, and projecting beyond the end of, the crank shaft, a clutch element mounted on the projecting end of the transmission main shaft, a second clutch element, and meshed speed reduction gearing connecting the second clutch element and engine crank shaft whereby a relatively small ring gear may be used and a compact power plant provided.

4. The combination set forth in claim 3 in which the second clutch element is mounted on a sleeve which encircles the transmission main shaft, and is freely rotatable thereon, one member of said gearing being fixed on said sleeve.

JESSE G. VINCENT.